(12) United States Patent
Netz (10) Patent No.: US 6,366,905 B1
(45) Date of Patent: Apr. 2, 2002

(54) AGGREGATIONS DESIGN IN DATABASE SERVICES

(75) Inventor: Amir Netz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/338,212

(22) Filed: Jun. 22, 1999

(51) Int. Cl.[7] ............................................. G06F 17/30
(52) U.S. Cl. ........................ 707/3; 707/1; 707/2; 707/4; 707/5; 707/102; 707/200
(58) Field of Search ............................. 707/1, 2, 3, 4, 707/5, 102, 200

(56) References Cited

U.S. PATENT DOCUMENTS

| | | | |
|---|---|---|---|
| 5,710,915 A | * | 1/1998 | McElhiney ................... 707/3 |
| 5,890,151 A | * | 3/1999 | Agrawal et al. ............... 707/5 |
| 5,926,820 A | * | 7/1999 | Agrawal et al. ............ 707/200 |
| 6,205,447 B1 | * | 3/2001 | Malloy ...................... 707/102 |

* cited by examiner

Primary Examiner—Diane D. Mizrahi
(74) Attorney, Agent, or Firm—Woodcock Washburn LLP (57) ABSTRACT

A method, apparatus, and software are disclosed for efficient selection of aggregations, or summaries of data in a database, for answering queries. Benefit/cost ratings are maintained for possible aggregations and are used in determining which aggregations should be selected. Lists of candidate and selected aggregations are also maintained, and aggregations are moved between these lists based on their benefit/cost ratings. These ratings are adjusted as aggregations are moved between the lists.

42 Claims, 5 Drawing Sheets

FIG. 1

YEAR ☐ 1

QUARTER ☐ 4

MONTH [______] 12

DETAILED DATA [________}  {________] 1,000,000

AGGREGATIONS DESIGN IN DATABASE SERVICES

RELATED APPLICATIONS

This application is related to copending applications having Ser. No. 09/338,390 and Ser. No. 09/337,757, both filed Jun. 22, 1999 and assigned to the instant assignee.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

TECHNICAL FIELD OF THE INVENTION

The present invention pertains generally to computer-implemented databases, and more particularly to summaries of data contained in such databases.

BACKGROUND OF THE INVENTION

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, a dimension is a structural attribute of a cube that is a list of members of a similar type in the user's perception of the data. For example, a time dimension can consist of days, weeks, months, and years, while a geography dimension can consist of cities, states/provinces, and countries. Dimensions act as indices for identifying values within a multi-dimensional array.

Databases are commonly queried for summaries of data rather than individual data items. For example, a user might want to know sales data for a given period of time without regard to geographical distinctions. These types of queries are efficiently answered through the use of data tools known as aggregations. Aggregations are precomputed summaries of selected data that allow an OLAP system or a relational database to respond quickly to queries by avoiding collecting and aggregating detailed data during query execution. Without aggregations, the system would need to use the detailed data to answer these queries, resulting in potentially substantial processing delays. With aggregations, the system computes and materializes aggregations ahead of time so that when the query is submitted to the system, the appropriate summary already exists and can be sent to the user much more quickly.

Calculating these aggregations, however, can be costly, both in terms of processing time and in terms of disk space consumed. Several conventional OLAP systems calculate all possible summaries of the data and suffer from substantial inefficiencies when working with large databases having many dimensions. Some other conventional OLAP systems allow the user to select specific pre-calculated aggregations, avoiding the delays associated with calculating all possible aggregations. Selecting an optimal set of aggregations for a given set of queries, however, is a complicated task that most end users would find difficult to perform at best. Still other OLAP systems do not create any aggregations at all. While this approach is workable for small data volumes, it is not efficient for use with large data volumes. Certain other OLAP systems implement algorithms for selecting aggregations, but fail to adequately consider the costs of creating and maintaining the aggregations.

Accordingly, a need continues to exist for a system that designs aggregation sets so as to make efficient use of computing resources.

SUMMARY OF THE INVENTION

According to various example implementations of the invention, there is provided an efficient system for selecting aggregations for use with a database, as described herein below. In particular, the invention provides, among other things, for the maintaining of benefit/cost ratings for possible aggregations. These ratings are used in determining which aggregations should be selected. Lists of candidate and selected aggregations are also maintained, and aggregations are moved between these lists based on their benefit/cost ratings. These ratings are adjusted as aggregations are moved between the lists.

According to one particular implementation, a set of aggregations is selected from a plurality of possible aggregations to answer a set of queries, by maintaining benefit/cost ratings for at least some of the possible aggregations. The benefit/cost rating for an aggregation is determined as a function of performance improvement attributable to the aggregation and of a computer resource cost associated with using the aggregation. A candidate set of candidate aggregations and a selected set of selected aggregations are also maintained. The benefit/cost rating for at least one of the possible aggregations is adjusted in response to moving a possible aggregation between the candidate and selected sets.

Another implementation is directed to a method involving determining benefit/cost ratings for at least some of the possible aggregations as a function of sizes of the aggregations. A candidate set of candidate aggregations and a selected set of selected aggregations are maintained and sorted in order of benefit/cost ratings. For each query in the set of queries, a best aggregation and a second best aggregation for answering the query are determined as a function of the sizes of the selected aggregations. At least one possible aggregation is moved between the candidate and selected sets. The benefit/cost rating for at least one of the possible aggregations is adjusted as a function of a size difference between at least one best aggregation and at least one second best aggregation.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
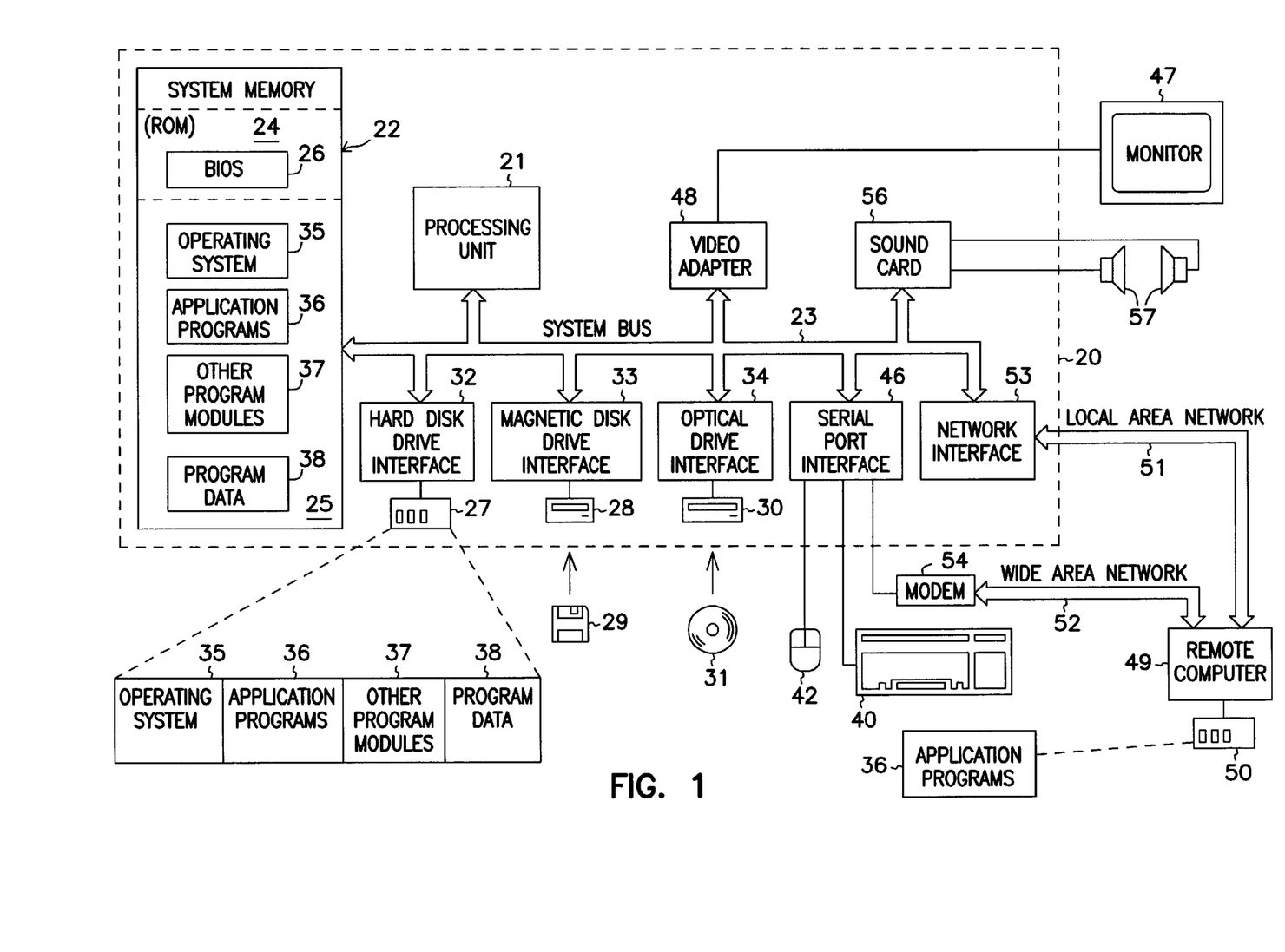
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments of the Invention

As an illustrative operational example, a small, three-dimensional OLAP cube is considered. This cube has a time dimension with four hierarchy levels: year, quarter, month, and day. The second dimension, a products dimension, has six levels: all products, department, category, subcategory, brand, and stock keeping unit (SKU). Finally, a geography dimension also has six levels: whole world, region, country, state, city, and ZIP code. It will be appreciated that the OLAP cube can have more or fewer dimensions than in this example.

For an OLAP cube, the number of possible types of aggregations is given by the product of the number of hierarchy levels in each of the dimensions. Thus, considering the OLAP cube described above, a total of 144 (4×6×6) types of aggregations are possible. Optimal performance would be achieved by materializing all of the possible types of aggregations because all of the possible query results would be precomputed. Materializing and maintaining all of these aggregations, however, is costly in terms of both calculation time and disk space. The present invention provides for, among other things, an OLAP system that assists the user in selecting only some of these aggregations to achieve good performance while realizing substantial savings in calculation time and disk space.

According to one example embodiment of the present invention, aggregations are selected by maintaining benefit/cost ratings for both selected aggregations and aggregations that could potentially selected, known as candidate aggregations. The benefit/cost rating for a particular aggregation, whether selected or candidate, considers the increase in performance gained by selecting the aggregation and the cost in computing resources of creating and maintaining the aggregation. As new candidate aggregations are evaluated and benefit/cost ratings are updated, aggregations may be selected or deselected. The selection and removal of aggregations, in turn, affects benefit/cost ratings. Thus, the selection process continues in an iterative manner until stopped by the user, or until predetermined optimization criteria are satisfied.

Different users may be willing to pay different prices for improved performance. For example, in some operating environments, disk space is at a premium, and the user may not be able to spare the disk space involved in materializing and maintaining an optimal number of aggregations. Other operating environments benefit from ample disk space, and the additional disk space requirements might not significantly affect the user. Because there are several possible selected sets of aggregations having varying degrees of performance benefits and storage costs, the system provides users with the ability to compare these possible selected sets and choose the set that best meets performance goals and addresses storage concerns.

As discussed above, aggregations are used to improve the response time of an OLAP system or relational database to queries. Aggregations allow the system to avoid collecting and aggregating detailed data when a query is executed. Rather, the system computes and materializes aggregations ahead of time so that, by the time a query is issued to the system, the proper summary of the detailed data already exists and can be presented to the user quickly.

Aggregations can be used to answer even queries that do not match them exactly. For example, a query as to yearly sales of a certain product can be answered using aggregations of sales per year. It is evident, however, that aggregations of sales per month can also be used to answer the query simply by adding aggregated sales data for all of the months in the year of interest. While this operation is not as direct as using an aggregation that matches the query exactly, it is still much better than adding sales on, for example, a daily basis. Thus, the benefit of an aggregation is that it eliminates, at least in part, the need to retrieve and manipulate more detailed data to answer a query.

It can be observed that, the more detailed an aggregation is, the more queries it can answer. For example, monthly aggregations can be used to answer queries relating to both monthly and yearly sales. By contrast, yearly aggregations are not sufficiently detailed to answer queries relating to monthly sales. Yearly aggregations are, however, more efficient than monthly aggregations at answering yearly sales queries. As a general matter, the less detailed an aggregation is, the more efficiently it can answer those queries that it is sufficiently detailed to answer.

One measure of the benefit of an aggregation involves comparing the costs of answering the queries with and without the existence of the aggregation. Cost can be measured in a variety of ways. Some systems measure cost in terms of the estimated time required to answer the query. Other systems measure consumption of computing resources, and still others might measure cost in other ways. It is well known in the art that a direct relationship exists between the size of an aggregation and the cost involved in querying it. Therefore, the size difference between aggregations is used to measure the benefit of an aggregation, according to a particular embodiment of the present invention. Because the size of an aggregation is independent of external variables, such as processor speed, aggregation size is a particularly advantageous cost metric.

Figure 2:
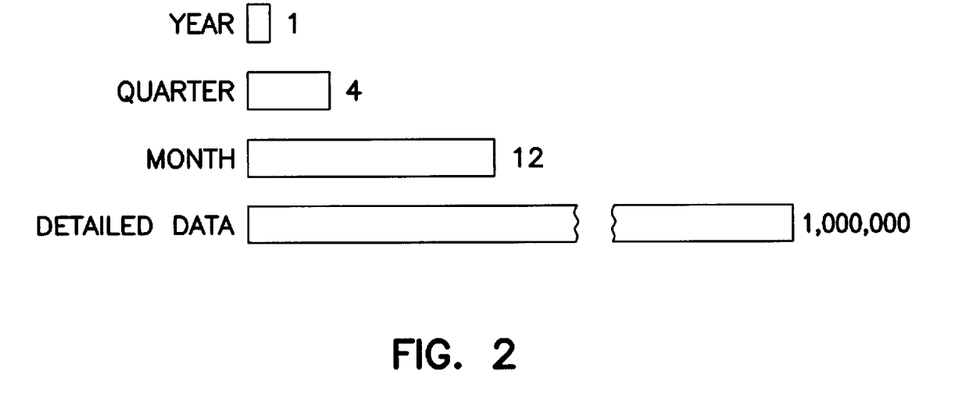
FIG. 2 conceptually illustrates a size comparison of various aggregations.

Using this metric, the benefit of an aggregation from a specific query is the number of rows of the database that will not be scanned due to the use of the aggregation. The benefit that can be derived by selecting a particular aggregation depends substantially on the other aggregations that have already been selected. For example, if the detailed sales data for a particular product family contains 1,000,000 rows, then selecting the product family-year-state aggregation, i.e., the aggregation of sales of product families per year per state, is greatly beneficial if no other aggregations exist. The benefit of selecting the product family-year-state aggregation can be expressed as the difference in sizes between the product family-year-state aggregation (one row) and the detailed data (1,000,000 rows), or 999,999. If, however, the product family-month-state aggregation has already been selected, the benefit of also selecting the product family-year-state aggregation is greatly diminished because this aggregation only avoids scanning twelve rows. In this case, the benefit of selecting the product family-year-state aggregation can be expressed as the difference in size between the product family-year-state aggregation (one row) and the product family-month-state aggregation (twelve rows), or 11. FIG. 2, which is not to scale, conceptually illustrates the difference in sizes between yearly, quarterly, and monthly aggregations and detailed data.

As a general matter, the benefit of an aggregation can be expressed as the difference between (1) the number of rows needed to answer the queries it can answer best and (2) the number of rows needed to answer those queries using the "second best" aggregation for each such query. If no "second best" aggregation exists, the number of detailed rows is substituted for the latter quantity. An aggregation can answer a query if it contains sufficiently detailed information for answering the query. For example, as discussed above, a monthly aggregation can answer a query for yearly sales data, but a yearly aggregation cannot answer a query for monthly sales data.

An aggregation is considered "best" to answer a query if it is the smallest aggregation that can answer a query. Similarly, a "second best" aggregation is the second smallest aggregation that can answer the query. For example, assume that product family-year-state (one row), product family-quarter-state (four rows), and product family-month-state (twelve rows) aggregations have all been materialized. Given these aggregations, the "best" and "second best" aggregations to answer a query for yearly sales data are the product family-year-state and product family-quarter-state aggregations. To answer a query for quarterly sales data, the "best" and "second best" aggregations are the product family-quarter-state and product family-month-state aggregations. It should be noted that the product family-year-state aggregation is not the "best" one because it does not contain sufficiently detailed information to answer the query.

Just as the benefit of an aggregation can be measured in a variety of ways, the cost of an aggregation can also be measured with a variety of metrics. Some systems calculate the cost in terms of the processing time required to materialize the aggregation, while others measure cost using different measures of computing resource consumption. As with measuring the benefit of an aggregation, however, cost is advantageously measured using the size of the aggregation as a metric, according to an embodiment of the present invention. This metric is particularly advantageous because the cost of storing the aggregation remains constant over time, while the processing effort involved in materializing the aggregation is transient and lasts only while the aggregation is being materialized.

The size of an aggregation can be determined in any of a variety of ways. One particular approach is disclosed in co-pending application U.S. Ser. No. 09/383,390 filed Jun. 22, 1999 and entitled "AGGREGATIONS SIZE ESTIMATION IN DATABASE SERVICES," which is assigned to the instant assignee. It should be noted, however, that any size estimation technique can be used consistent with the present invention. In a particular implementation, aggregation size is expressed in terms of rows rather than bytes because this measure ensures that performance gains and aggregation costs are expressed in similar terms.

Figure 3:
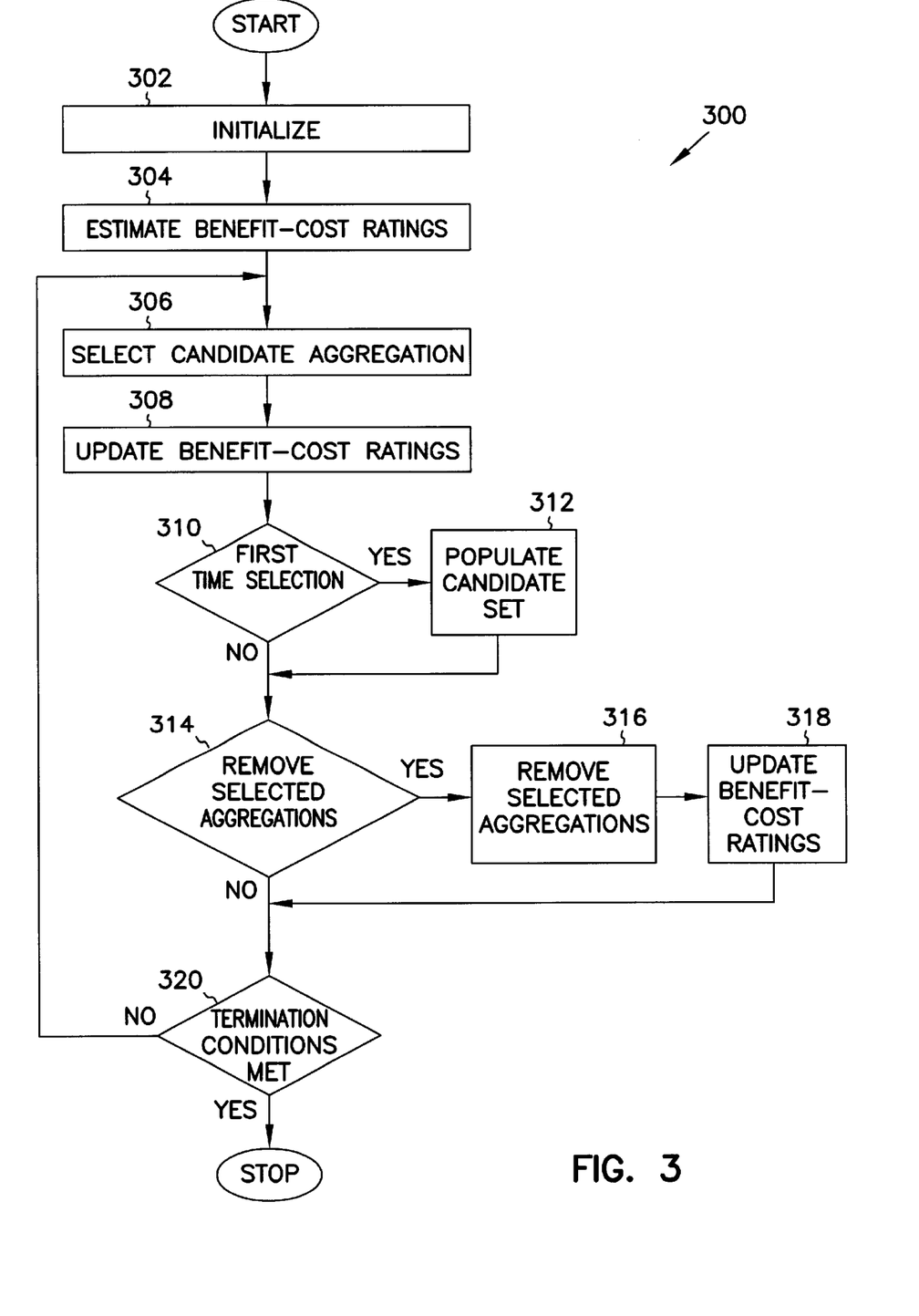
FIG. 3 is a flowchart depicting an iterative method for selecting aggregations, according to an implementation of the present invention.

Referring now to FIG. 3, an example iterative method 300 of selecting aggregations according to an implementation of the present invention is depicted. In this embodiment, the name of a candidate aggregation to be selected is actually materialized only when it is actually needed for evaluating the cost and benefit of the candidate aggregation. Delaying materializing the name of the candidate aggregation conserves computing resources and allows the method 300 to scale up well to databases for which there are many possible aggregations. Accordingly, two sets of aggregations play a role in the method 300: candidate aggregations and selected aggregations. As the method 300 progresses, aggregations are moved between the candidate and selected sets in a gradual manner. The manner in which the selected set is changed gradually increases the size of the selected aggregations while improving performance gain, as measured in the number of row scans saved.

First, at a block 302, the system initializes the candidate and selected sets and the list of queries needed to evaluate the aggregations. Initially, the candidate set is empty. Every aggregation is initially a candidate aggregation that may be selected and moved from the candidate set to the selected set. Later, if the system determines that the usefulness of the selected aggregation is not as high as some candidate aggregation, it moves the selected aggregation from the selected set back into the candidate set. It should be noted that the aggregation is moved into the candidate set because it might be reselected at some point in the future.

The candidate list is initialized using a root aggregation, which is the highest level aggregation that aggregates the topmost hierarchy level from each dimension. For example, the root aggregation in the operational example is an all products-year-world aggregation. The root aggregation can only answer one type of query—namely, a query relating to worldwide sales data for all products during a particular year. For this type of aggregation, however, the potential benefit of the root aggregation is great, as it is the difference between the aggregation cost and the cost of querying detailed facts, which can include millions of rows. While other possible aggregations could be inserted into the candidate set during initialization, inserting them is not necessary because the best benefit/cost ratio is with the smallest aggregation, i.e., the root aggregation.

Evaluating the benefit of a set of aggregations also involves the use of a set of queries that will be issued to the OLAP system or relational database. If no a priori information is known about which queries will be requested, the system assumes that the probability of each query occurring is the same. Therefore, to evaluate the benefit of any set of aggregations, the system uses a set of queries having one representative query from each type of query to evaluate the benefit of any set of aggregations.

After these sets are initialized, the benefit/cost ratios of the candidate and selected aggregations are estimated, as depicted at a block 304. During the first pass of the method 300, there are no selected aggregations and only one candidate aggregation, the root aggregation. The potential benefit of an aggregation is determined by comparing it, for every query that it can answer, to the current "best" selected aggregation for that query, i.e., the "best" selected aggregation before selection of the candidate aggregation.

If the candidate aggregation is smaller than the current "best" selected aggregation, then the potential benefit of the candidate aggregation is the difference in the sizes of the two aggregations. If no aggregations are selected that can answer a query, then the potential benefit is the difference between the size of the candidate aggregation and the size of the detailed facts. Thus, as discussed above, the potential benefit of the root aggregation is the difference between the aggregation cost and the cost of querying detailed facts, as there are no selected aggregations immediately after initialization.

For selected aggregations, a benefit measure, rather than a potential benefit measure, is maintained. The benefit measure describes the additional computation cost that would be incurred if the selected aggregation were removed from the selected set. It is calculated as the sum, taken over all of the queries for which the selected aggregation is the "best" aggregation, of the differences in cost between (1) using the selected aggregation to answer each respective query and (2) using the "second best" selected aggregation to answer the query. Because this measure compares the "best" and "second best" aggregations for answering queries, it is particularly helpful to maintain a list of the "best" and "second best" aggregations for answering each query. Keeping constant track of the potential benefit of candidate aggregations and the benefit of selected aggregations is important in allowing the method 300 to scale up to large databases.

From the set of candidate aggregations, the candidate aggregation with the highest benefit/cost ratio is selected and moved to the selected set, as depicted at a block 306. In order to avoid costly searches for the candidate aggregation having the highest benefit/cost ratio, it is recommended that the candidate list be maintained sorted or indexed by the benefit/cost ratio. Before this candidate aggregation has been selected, the benefit/cost ratios of the aggregations, candidate and selected, that are affected by the selection of this candidate aggregation are updated.

Figure 4:
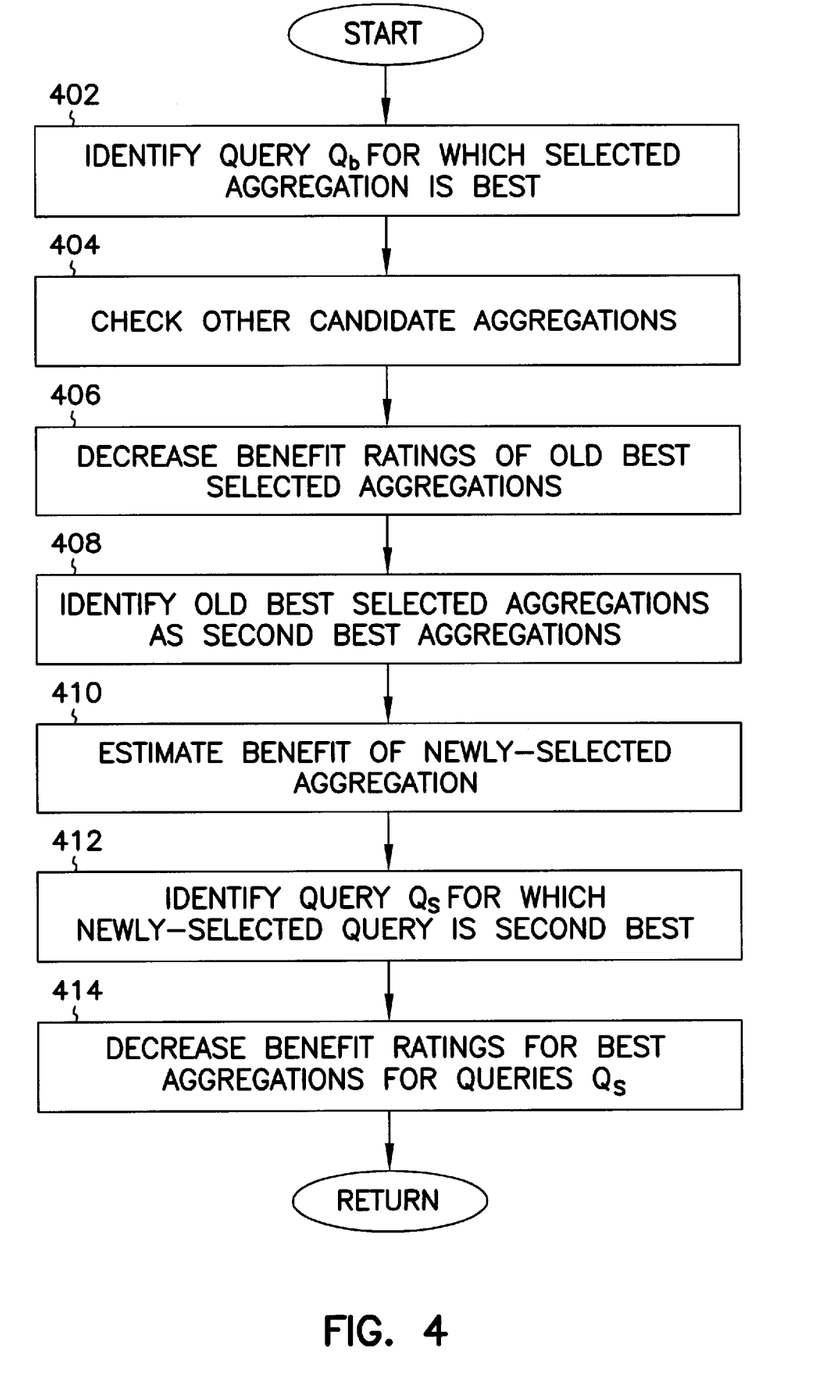
FIG. 4 is a flowchart depicting a process for updating benefit/cost ratings in response to selection of an aggregation, according to another implementation of the present invention.

FIG. 4 is a flowchart illustrating the update process in greater detail. First, at a block 402, all of the queries $Q_b$ for which the newly selected aggregation becomes the "best" aggregation for answering are identified. Next, at a block 404, the system checks each of the candidate aggregations that can answer the queries $Q_b$ to determine whether its potential benefit should be decreased because it might not be smaller than the newly selected aggregation, which is now the new "best" aggregation for these queries.

As depicted at a block 406, the system then decreases the benefit rating of each of the old "best" selected aggregations for the queries $Q_b$ because they are no longer the best aggregations for answering the queries $Q_b$. In other words, if the old "best" aggregations are removed, there would be no degradation in performance for the queries $Q_b$.

The old "best" aggregations are then identified as "second best" aggregations for the queries $Q_b$, as depicted at a block 408. Next, at a block 410, the benefit of the newly selected aggregation is calculated as the sum over all of the queries $Q_b$ of the cost differences, e.g., size differences, between the old "best" (new "second best") aggregation and the newly selected aggregation.

Certain other selected aggregations may also decrease in benefit because, while they are still the best aggregations for some queries, the newly selected aggregation may be almost as good for answering those queries. To account for this consideration, the system at a block 412 identifies the queries $Q_s$ for which the newly selected aggregation is the "second best", that is, second smallest, aggregation for answering. The system decreases the benefit rating of each of the "best" selected aggregations for answering the queries $Q_s$ because the performance degradation of removing them from the selected set will be lower due to the newly selected aggregation. The newly selected aggregation is a better or smaller "second best" aggregation for answering the queries $Q_s$ than the old "second best" aggregations. Therefore, at a block 414, the benefit rating for each of the "best" aggregations for answering the queries $Q_s$ is decreased by the difference between the cost of the old "second best" aggregation and the cost of the newly selected aggregation.

The newly selected aggregation is then moved to the selected set. In order to allow the system to scale up to large numbers of possible combinations, it is important to keep track of the changes discussed above in connection with FIG. 4 only on those aggregations that are affected by the selection of the newly selected aggregation.

Referring again to FIG. 3, after the update process depicted in FIG. 4 has been performed, the system determines, at a decision block 310, whether the newly selected aggregation was selected for the first time. If so, the candidate set is populated with the names of all of the aggregations that are one step more detailed than the newly selected aggregation, as depicted at a block 312. To populate the candidate set, each dimension is considered. If the hierarchy level of the dimension in the newly selected aggregation is not the most detailed level, a new aggregation is constructed that has the same hierarchy levels for the other dimensions as the newly selected aggregation. The new aggregation, however, uses a hierarchy level that is one step more detailed for the dimension under consideration. For example, in the operational example, the first candidate aggregation to be selected is the root aggregation, which is an all products-year-world aggregation. The newly constructed aggregations would then be department-year-world, all products-quarter-world, and all products-year-region aggregations. Finally, each of the newly constructed aggregations that is in neither the candidate nor the selected set is added to the candidate set. Dynamically adding candidate aggregations in this manner rather than creating all possible aggregations at the outset is an optimization technique that allows the system to scale up more efficiently.

As discussed above in connection with block 406 of FIG. 4, the insertion of a newly selected aggregation into the selected set can cause the benefit of the old "best" aggregations, which are now "second best" aggregations, to decrease. In some cases, the benefit of a specific selected aggregation may decrease sufficiently such that the second best candidate aggregation might actually have a better potential benefit/cost ratio. In this case, the selected set would be better in terms of benefit/cost ratio if the selected aggregation with the lowest benefit/cost ratio is removed from the selected set back into the candidate set. Thus, at a decision block 314 of FIG. 3, the system determines whether any selected aggregations should be deselected and moved back to the candidate set. In particular, the selected aggregations that have a benefit/cost ratio lower than the next best candidate aggregation's potential benefit/cost ratio are removed at a block 316.

Before a selected aggregation is removed to the candidate set, the benefit/cost ratings of the aggregations, candidate and selected, that are affected by the removal of this selected aggregation are updated.

Figure 5:
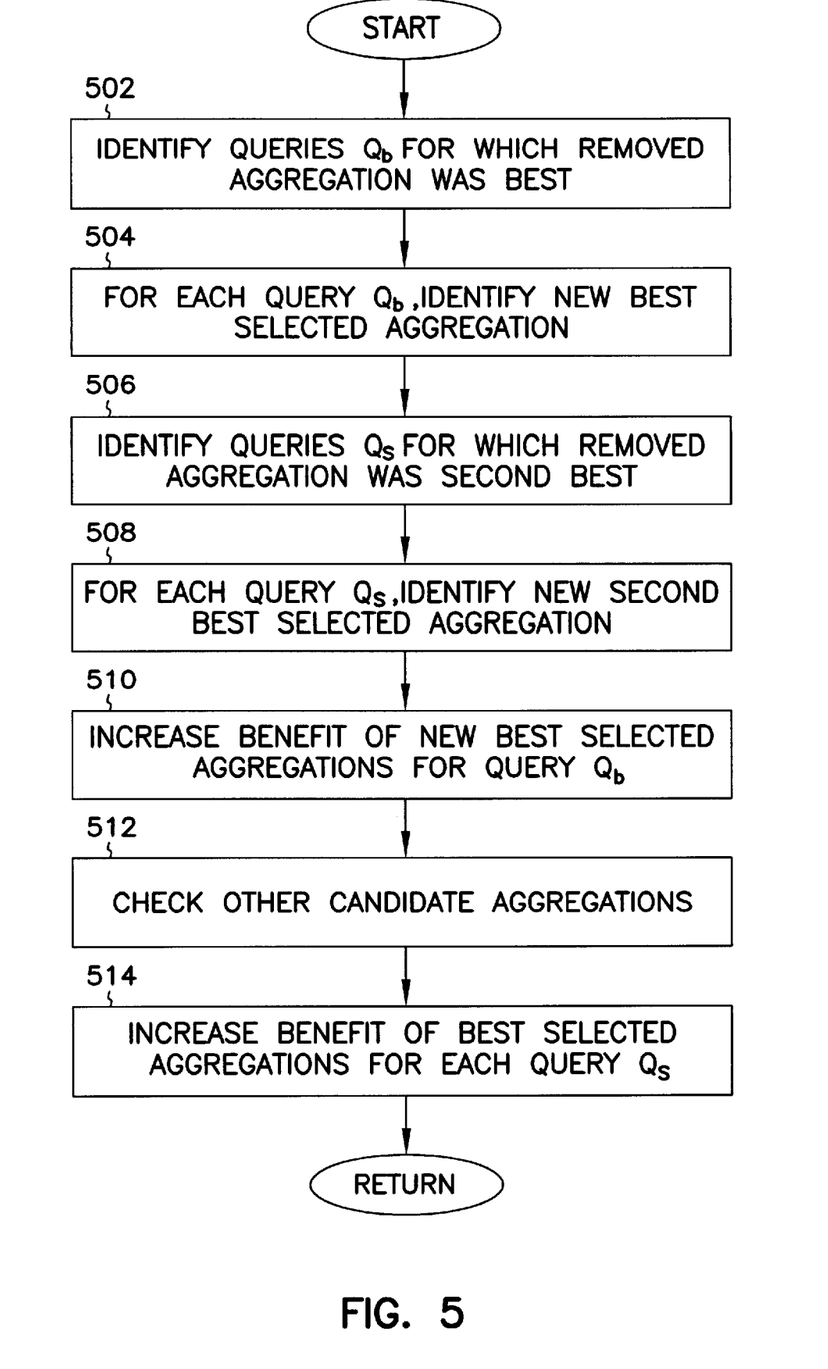
FIG. 5 is a flowchart depicting a process for updating benefit/cost ratings in response to removal of a selected aggregation, according to still another implementation of the present invention.

FIG. 5 is a flowchart illustrating the update process in greater detail. First, at a block 502, all of the queries $Q_b$ for which the newly removed aggregation was the "best" aggregation are identified. Next, at a block 504, the system identifies, for each query $Q_b$, the new "best" selected aggregation, i.e., the "best" selected aggregation in the absence of the newly removed aggregation, and the new "second best" selected aggregation. It will be appreciated that, for a particular query $Q_b$, the new "best" selected aggregation is the old "second best" aggregation. As depicted at a block 506, the system then identifies all of the queries $Q_s$ for which the newly removed aggregation was the "second best" aggregation and, for each query $Q_s$ identifies the new "second best" aggregation, as shown at a block 508.

The benefit ratings of the new "best" selected aggregations for the queries $Q_b$ are increased because these aggregations are now the best aggregations for answering the queries $Q_b$. This updating process is depicted at a block 510. The benefit ratings are increased because, if the new "best" aggregations are removed, performance for the queries $Q_b$ will be degraded. Specifically, the amount of increase in the benefit rating is the size or cost difference between the new "best" and the new "second best" aggregations.

Next, at a block 512, the system checks each of the other candidate aggregations that can answer the queries $Q_b$ to determine whether their potential benefit should be increased because they might now be smaller than the new "best" aggregations for these queries $Q_b$. If so, the potential benefit rating is increased by the size or cost difference between the newly removed aggregation and the new "best" aggregation.

Finally, at a block 514, the benefit of the "best" selected aggregation for each query $Q_s$ is increased because the performance degradation associated with removing it is greater. The amount of the increase in the benefit rating is the size or cost difference between the old "second best" aggregation and the new "second best" aggregation.

The newly selected aggregation is then moved to the selected set. In order to allow the system to scale up to large numbers of possible combinations, it is important to keep track of the changes discussed above in connection with FIG. 4 only on those aggregations that are affected by the selection of the newly selected aggregation.

The newly removed aggregation is then moved to the candidate set. In order to allow the system to scale up to large numbers of possible combinations, it is important to keep track of the changes discussed above in connection with FIG. 5 only on those aggregations that are affected by the selection of the newly removed aggregation.

Referring again to FIG. 3, after the update process depicted in FIG. 5 has been performed, flow proceeds to a decision block 320, where the system determines whether termination conditions have been satisfied. For example, one termination condition might be user termination of the aggregation selection method. Another termination condition might be the attainment of a predetermined cost threshold. If any applicable termination conditions have been satisfied, the process stops. If not, the system returns to the block 306, and another candidate aggregation is selected. The process repeats iteratively until the termination condition or conditions have been satisfied.

By taking the cost of creating and maintaining aggregations into account, the present invention allows the user to achieve a balance between cost and performance that is best suited for the particular application and operating environment. Efficient use of computing resources is thus facilitated. Further, the techniques described herein can be used to quickly and efficiently select a set of aggregations even in OLAP cubes having many dimensions and levels.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof. In addition, while various embodiments have been described with particular application to OLAP systems, the invention is not so limited. On the contrary, the present invention can be implemented for use in connection with relational databases and other systems that store and manipulate data.

What is claimed is:

1. A method for designing a set of aggregations selected from a plurality of possible aggregations to answer a set of queries, the method comprising:

maintaining benefit/cost ratings for at least some of the possible aggregations, the benefit/cost rating for an aggregation being determined as a function of performance improvement attributable to the aggregation and of a computer resource cost associated with using the aggregation;

maintaining a candidate set of candidate aggregations and a selected set of selected aggregations; and adjusting the benefit/cost rating for at least one of the possible aggregations in response to moving a possible aggregation between the candidate and selected sets.

2. The method according to claim 1, wherein the benefit/cost rating for an aggregation is determined as a function of at least one of a size of the aggregation and a size of another aggregation.

3. The method according to claim 1, wherein the candidate aggregations of the candidate set are sorted in order of their respective benefit/cost ratings.

4. The method according to claim 1, further comprising selecting the candidate aggregation of the candidate set having the highest benefit/cost rating.

5. The method according to claim 4, further comprising, for each query in the set of queries, determining a best aggregation for answering the query and a second best aggregation for answering the query as a function of the sizes of the selected aggregations.

6. The method according to claim 5, further comprising:

identifying, within the set of queries, a first subset of queries for which the selected candidate aggregation is the best aggregation and a second subset of queries for which the selected candidate aggregation is the second best aggregation;

determining, for each candidate aggregation that can answer a query of the first subset of queries, whether its benefit/cost rating should be adjusted;

adjusting the benefit/cost ratings of the former best aggregations for the first subset of queries;

determining the benefit of the selected candidate aggregation by summing the differences in sizes between the former best aggregation for each query of the first subset of queries and the selected candidate aggregation; and adjusting the benefit/cost ratings of the best aggregations for answering the queries of the second subset of queries.

7. The method according to claim 5, further comprising:

comparing the benefit/cost ratings of the selected aggregations and of the candidate aggregations; and in response to the benefit/cost rating of a particular selected aggregation being lower than the benefit/cost rating of any candidate aggregation, removing the particular selected aggregation from the selected set to the candidate set.

8. The method according to claim 7, further comprising adjusting the benefit/cost rating of at least one possible aggregation to account for removing the selected aggregation from the selected set.

9. The method according to claim 7, further comprising:

identifying, within the set of queries, a first subset of queries for which the removed aggregation was the best aggregation and a second subset of queries for which the removed aggregation was the second best aggregation;

for each query of the first subset of queries, identifying a new best aggregation in the absence of the removed aggregation;

for each query of the second subset of queries, identifying a new second best aggregation in the absence of the removed aggregation;

adjusting the benefit/cost ratings of the new best aggregations for the first subset of queries;

determining, for each candidate aggregation that can answer a query of the first subset of queries, whether its benefit/cost rating should be adjusted; and adjusting the benefit/cost ratings of the best aggregations for the second subset of queries.

10. The method according to claim 4, further comprising, for each selected candidate aggregation that is selected for the first time, populating the candidate set with possible aggregations that are one level more detailed than the selected candidate aggregation.

11. The method according to claim 1, wherein maintaining the benefit/cost ratings, maintaining the candidate and selected sets, and adjusting the benefit/cost ratings are performed iteratively until at least one termination condition is satisfied.

12. The method according to claim 1, wherein the possible aggregations are computed as a function of data within an OLAP system.

13. The method according to claim 1, wherein the possible aggregations are computed as a function of data within a relational database.

14. A method for designing a set of aggregations selected from a plurality of possible aggregations to answer a set of queries, the method comprising:

determining benefit/cost ratings for at least some of the possible aggregations as a function of sizes of the aggregations;

maintaining a candidate set of candidate aggregations and a selected set of selected aggregations, each set being sorted in order of benefit/cost ratings;

determining, for each query in the set of queries, a best aggregation and a second best aggregation for answering the query as a function of the sizes of the selected aggregations;

moving at least one possible aggregation between the candidate and selected sets; and adjusting the benefit/cost rating for at least one of the possible aggregations as a function of a size difference between at least one best aggregation and at least one second best aggregation.

15. A computer-readable medium for use in designing a set of aggregations selected from a plurality of possible aggregations to answer a set of queries, the computer-readable medium having computer-executable instructions for:

maintaining benefit/cost ratings for at least some of the possible aggregations, the benefit/cost rating for an aggregation being determined as a function of performance improvement attributable to the aggregation and of a computer resource cost associated with using the aggregation;

maintaining a candidate set of candidate aggregations and a selected set of selected aggregations; and adjusting the benefit/cost rating for at least one of the possible aggregations in response to moving a possible aggregation between the candidate and selected sets.

16. The computer-readable medium, according to claim 15, wherein the benefit/cost rating for an aggregation is determined as a function of at least one of a size of the aggregation and a size of another aggregation.

17. The computer-readable medium, according to claim 15, having further computer-executable instructions for sorting the candidate aggregations of the candidate set in order of their respective benefit/cost ratings.

18. The computer-readable medium, according to claim 15, having further computer-executable instructions for selecting the candidate aggregation of the candidate set having the highest benefit/cost rating.

19. The computer-readable medium, according to claim 18, having further computer-executable instructions for determining, for each query in the set of queries, a best aggregation for answering the query and a second best aggregation for answering the query as a function of the sizes of the selected aggregations.

20. The computer-readable medium, according to claim 19, having further computer-executable instructions for:

identifying, within the set of queries, a first subset of queries for which the selected candidate aggregation is the best aggregation and a second subset of queries for which the selected candidate aggregation is the second best aggregation;

determining, for each candidate aggregation that can answer a query of the first subset of queries, whether its benefit/cost rating should be adjusted;

adjusting the benefit/cost ratings of the former best aggregations for the first subset of queries;

determining the benefit of the selected candidate aggregation by summing the differences in sizes between the former best aggregation for each query of the first subset of queries and the selected candidate aggregation; and adjusting the benefit/cost ratings of the best aggregations for answering the queries of the second subset of queries.

21. The computer-readable medium, according to claim 19, having further computer-executable instructions for:
comparing the benefit/cost ratings of the selected aggregations and of the candidate aggregations; and
in response to the benefit/cost rating of a particular selected aggregation being lower than the benefit/cost rating of any candidate aggregation, removing the particular selected aggregation from the selected set to the candidate set.

22. The computer-readable medium, according to claim 21, having further computer-executable instructions for adjusting the benefit/cost rating of at least one possible aggregation to account for removing the selected aggregation from the selected set.

23. The computer-readable medium, according to claim 21, having further computer-executable instructions for:
identifying, within the set of queries, a first subset of queries for which the removed aggregation was the best aggregation and a second subset of queries for which the removed aggregation was the second best aggregation;
for each query of the first subset of queries, identifying a new best aggregation in the absence of the removed aggregation;
for each query of the second subset of queries, identifying a new second best aggregation in the absence of the removed aggregation;
adjusting the benefit/cost ratings of the new best aggregations for the first subset of queries;
determining, for each candidate aggregation that can answer a query of the first subset of queries, whether its benefit/cost rating should be adjusted; and
adjusting the benefit/cost ratings of the best aggregations for the second subset of queries.

24. The computer-readable medium, according to claim 19, having further computer-executable instructions for populating the candidate set with possible aggregations that are one level more detailed than the selected candidate aggregation for each selected candidate aggregation that is selected for the first time.

25. The computer-readable medium, according to claim 15, having further computer-executable instructions for maintaining the benefit/cost ratings, maintaining the candidate and selected sets, and adjusting the benefit/cost ratings iteratively until at least one termination condition is satisfied.

26. The computer-readable medium, according to claim 15, wherein the possible aggregations are computed as a function of data within an OLAP system.

27. The computer-readable medium, according to claim 15, wherein the possible aggregations are computed as a function of data within a relational database.

28. A computer-readable medium for use in designing a set of aggregations selected from a plurality of possible aggregations to answer a set of queries, the computer-readable medium having computer-executable instructions for:
determining benefit/cost ratings for at least some of the possible aggregations as a function of sizes of the aggregations;
maintaining a candidate set of candidate aggregations and a selected set of selected aggregations, each set being sorted in order of benefit/cost ratings;
determining, for each query in the set of queries, a best aggregation and a second best aggregation for answering the query as a function of the sizes of the selected aggregations;
moving at least one possible aggregation between the candidate and selected sets; and
adjusting the benefit/cost rating for at least one of the possible aggregations as a function of a size difference between at least one best aggregation and at least one second best aggregation.

29. A computer arrangement for use in designing a set of aggregations selected from a plurality of possible aggregations to answer a set of queries, the computer arrangement configured to:
maintain benefit/cost ratings for at least some of the possible aggregations, the benefit/cost rating for an aggregation being determined as a function of performance improvement attributable to the aggregation and of a computer resource cost associated with using the aggregation;
maintain a candidate set of candidate aggregations and a selected set of selected aggregations; and
adjust the benefit/cost rating for at least one of the possible aggregations in response to moving a possible aggregation between the candidate and selected sets.

30. The computer arrangement, according to claim 29, wherein the benefit/cost rating for an aggregation is determined as a function of at least one of a size of the aggregation and a size of another aggregation.

31. The computer arrangement, according to claim 29, further configured to sort the candidate aggregations of the candidate set in order of their respective benefit/cost ratings.

32. The computer arrangement, according to claim 29, further configured to select the candidate aggregation of the candidate set having the highest benefit/cost rating.

33. The computer arrangement, according to claim 32, further configured to determine, for each query in the set of queries, a best aggregation for answering the query and a second best aggregation for answering the query as a function of the sizes of the selected aggregations.

34. The computer arrangement, according to claim 33, further configured to:
identify, within the set of queries, a first subset of queries for which the selected candidate aggregation is the best aggregation and a second subset of queries for which the selected candidate aggregation is the second best aggregation;
determine, for each candidate aggregation that can answer a query of the first subset of queries, whether its benefit/cost rating should be adjusted;
adjust the benefit/cost ratings of the former best aggregations for the first subset of queries;
determine the benefit of the selected candidate aggregation by summing the differences in sizes between the former best aggregation for each query of the first subset of queries and the selected candidate aggregation; and
adjust the benefit/cost ratings of the best aggregations for answering the queries of the second subset of queries.

35. The computer arrangement, according to claim 33, further configured to:
compare the benefit/cost ratings of the selected aggregations and of the candidate aggregations; and
in response to the benefit/cost rating of a particular selected aggregation being lower than the benefit/cost rating of any candidate aggregation, remove the particular selected aggregation from the selected set to the candidate set.

36. The computer arrangement, according to claim 35, further configured to adjust the benefit/cost rating of at least one possible aggregation to account for removing the selected aggregation from the selected set.

37. The computer arrangement, according to claim 35, further configured to:

identify, within the set of queries, a first subset of queries for which the removed aggregation was the best aggregation and a second subset of queries for which the removed aggregation was the second best aggregation;

for each query of the first subset of queries, identify a new best aggregation in the absence of the removed aggregation;

for each query of the second subset of queries, identify a new second best aggregation in the absence of the removed aggregation;

adjust the benefit/cost ratings of the new best aggregations for the first subset of queries;

determine, for each candidate aggregation that can answer a query of the first subset of queries, whether its benefit/cost rating should be adjusted; and adjust the benefit/cost ratings of the best aggregations for the second subset of queries.

38. The computer arrangement, according to claim 32, further configured to populate the candidate set with possible aggregations that are one level more detailed than the selected candidate aggregation for each selected candidate aggregation that is selected for the first time.

39. The computer arrangement, according to claim 29, further configured to maintain the benefit/cost ratings, maintain the candidate and selected sets, and adjust the benefit/cost ratings iteratively until at least one termination condition is satisfied.

40. The computer arrangement, according to claim 29, wherein the possible aggregations are computed as a function of data within an OLAP system.

41. The computer arrangement, according to claim 29, wherein the possible aggregations are computed as a function of data within a relational database.

42. A computer arrangement for use in designing a set of aggregations selected from a plurality of possible aggregations to answer a set of queries, the computer arrangement configured to:

determine benefit/cost ratings for at least some of the possible aggregations as a function of sizes of the aggregations;

maintain a candidate set of candidate aggregations and a selected set of selected aggregations, each set being sorted in order of benefit/cost ratings;

determine, for each query in the set of queries, a best aggregation and a second best aggregation for answering the query as a function of the sizes of the selected aggregations;

move at least one possible aggregation between the candidate and selected sets; and adjust the benefit/cost rating for at least one of the possible aggregations as a function of a size difference between at least one best aggregation and at least one second best aggregation.

* * * * *